Figure 1:
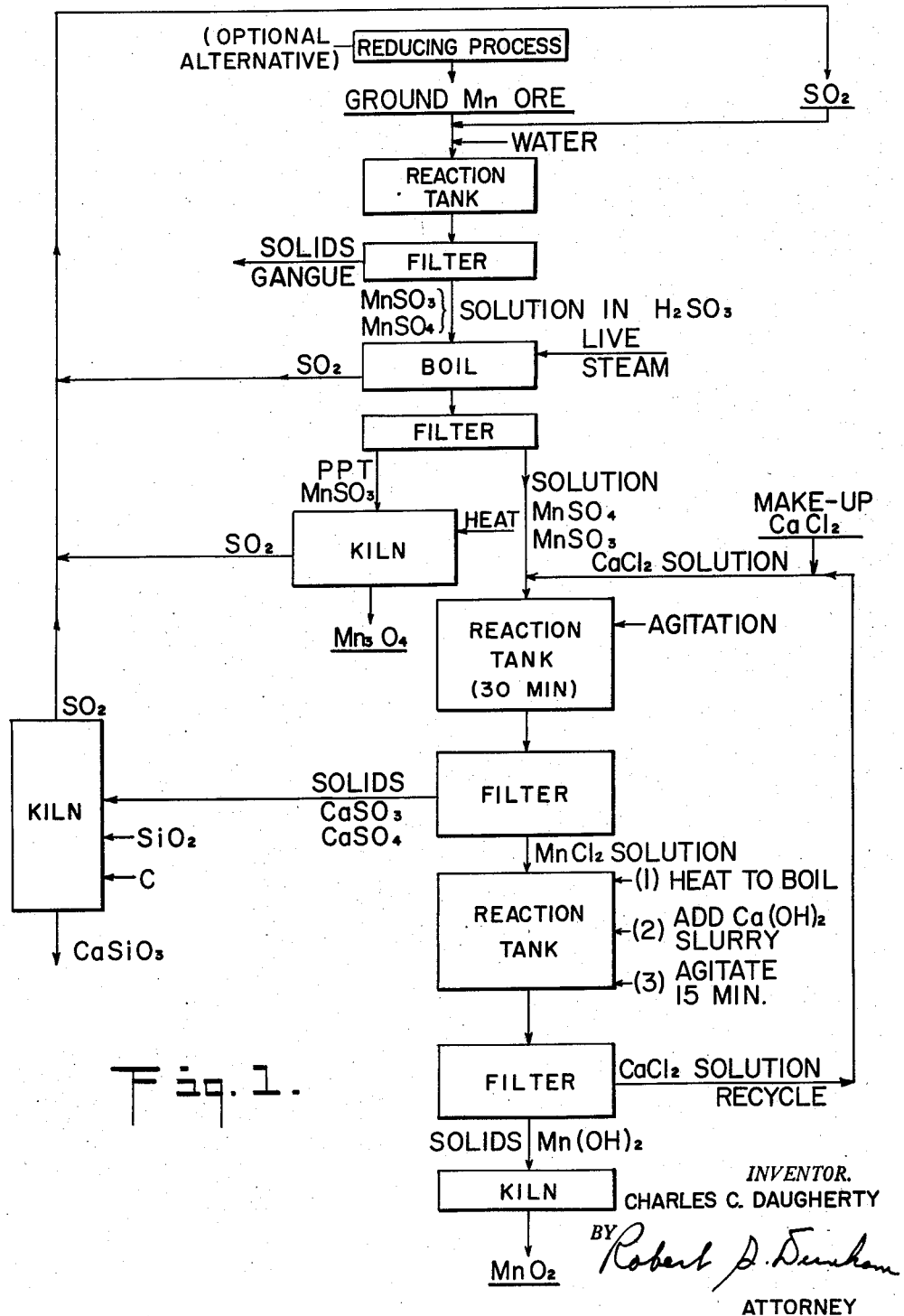

June 9, 1959   C. C. DAUGHERTY   2,890,103
RECOVERY OF MANGANESE FROM ORES
Filed Nov. 13, 1957         2 Sheets—Sheet 1

INVENTOR.
CHARLES C. DAUGHERTY
BY Robert D. Dunham
ATTORNEY

INVENTOR.
CHARLES C. DAUGHERTY
ATTORNEY

United States Patent Office 2,890,103
Patented June 9, 1959

2,890,103

RECOVERY OF MANGANESE FROM ORES

Charles C. Daugherty, Cradock, Va., assignor to Republic Steel Corporation, Cleveland, Ohio, a corporation of New Jersey Application November 13, 1957, Serial No. 696,284

6 Claims. (Cl. 23—145)

The present invention relates to a method of recovering manganese from ores in which manganese occurs in different valence states; and more particularly for the extraction and recovery of manganese values from relatively low grade ores which may contain not more than about 15% to 20% manganese and which may, in some instances, contain not over about 10% or 12% thereof. More specifically, the invention is directed to a method for separating and concentrating manganese from ores of the character described above, wherein the ores contain iron, usually in an amount greater than the amount of manganese present.

As such, the present invention is a continuation-in-part of my prior and copending application, Serial No. 406,-521, filed January 27, 1954, and having the same title, this prior application being now abandoned. The present invention is also related to and constitutes an improvement upon my invention relating to a process of recovery of manganese from ores described and claimed in Patent No. 2,747,965, issued May 29, 1956.

The present application is also related to an application being filed concurrently herewith and identified as Serial No. 696,285, filed November 13, 1957, which is a continuation-in-part of my application Serial No. 406,545, filed January 27, 1954 (now abandoned), which was copending with my application Serial No. 406,521 aforesaid. The line of division between the present application and said application, Serial No. 696,285, is based on the principle that the present application contains all claim subject matter common to these two cases; while said application, Serial No. 696,285, contains only claims readable on that application and not supported by the present disclosure.

Although the methods described and claimed herein are applicable to ores of the above-stated character from other regions, they have been developed and are found particularly successful for the treatment of manganiferous ores found in Maine, especially in deposits in Aroostoock County. These Maine ores have a high phosphorus content as well as a large iron content; and because of the phosphorus, pyrometallurgical treatments appear unduly expensive. At the same time, the chemical combination or combinations in which the manganese occur in Maine ores, apparently to a large extent as manganous carbonate, and partially as silicate, or perhaps in the form of double or complex compounds of iron and manganese, in which the managnese occurs in several valence states, is such that no effective results are obtainable with conventional physical concentration or beneficiation methods.

While ores of this type have been known and available for some years, the difficulty and cost of recovering the manganese therefrom in a commercially desirable concentration and purity has been such that little use has been made of these ores, notwithstanding the more or less critical character of manganese as a metal useful in many materials at the present time, and particularly useful as an alloying ingredient in steel. The practical utility of these ores must be measured by economic factors as well as by chemical factors, as there is a practical limit that the commercial industry will pay for manganese, considering the degree of purity thereof; and a method of recovery of this metal, to be successful commercially, must be such as to produce the metal of an acceptable degree of purity and within the price range which makes it commercially salable.

A typical Maine ore of the type hereinabove mentioned has been found to contain about 12% manganese, about 21% iron and slightly less than 1% phosphorus. This ore has been used in the several examples given hereinafter, illustrating the applicability of the present process. It will be understood that in order that the product of this process be attractive commercially, it must have a relatively high manganese content, usually over 50%. At the same time, while it is not absolutely essential that the iron content be reduced to zero, it is a relatively critical factor, at least from an economic point of view, that the iron content be maintained at not over some tolerable maximum. For some purposes for which manganese may be desired, this maximum may be as high as 4% or 5%. However, because of the similarity in many chemical properties of manganese and iron, and because the ore initially contains more iron than manganese, a very real problem of selective extraction of the manganese is presented by Maine ores of the type to which the present invention pertains. A principal general object of this invention, therefore, is to provide a method of recovery of manganese from ores of the type above-identified with not over a tolerable amount of iron contained therein and at a price which makes the method attractive from a commercial point of view.

In the method described in my patent mentioned above, the manganese values are extracted from the ore by leaching the ore with a calcium chloride solution saturated with sulfur dioxide, while preventing, so far as possible, the access of external oxidizing agents to the mixture during the leaching operation. The sulfur dioxide forms insoluble sulfites or sulfates, chiefly with the calcium in the calcium chloride, and possibly with certain metallic components (other than manganese) of the ore; and these sulfites and sulfates precipitate and may be filtered or otherwise separated, along with the gangue, from the manganese-containing solution. Consequently, much of the sulfur dioxide cannot be recovered economically from the gangue. After the leaching operation, the dissolved manganese values, then in the form of manganese chloride, are precipitated from the solution by treating it with a milk of lime slurry, so that the manganese values are precipitated as oxides or hydrated oxides.

The present invention provides a commercially desirable modification of this patented process in that the present process or method permits of the recovery and recycling of substantially all the sulfur dioxide, thereby decreasing the cost of the reagents required to carry on the process and making the process more attractive from an economic point of view.

A principal feature of the present invention is the discovery that in the case of ores of this kind containing relatively small amounts of manganese and relatively larger amounts of iron, a preferential or selective recovery of manganese may be attained, which will be perhaps not mathematically complete, but nevertheless is sufficiently selective to be commercially attractive, and which is attained by leaching the ore in an aqueous solution consisting essentially of sulfur dioxide in water. This solution should be saturated with sulfur dioxide and contain substantially no oxygen or oxidizing agents, the leaching being effected out of contact with air or other oxygen-containing gases. Under these circumstances, a very large proportion, although not all, of the manganese is brought into solution; while the dissolving or solubilizing of most of the iron is prevented. This action is unexpected for the reasons that while it is known that manganese sulfate is soluble in water, and further, that manganese sulfite is largely insoluble in water, but soluble in saturated aqueous solutions of sulfur dioxide; it is also known that iron sulfates (both ferric and ferrous) are soluble in water, and further that ferrous sulfite is soluble in aqueous solutions of sulfur dioxide to substantially the same extent that manganese sulfite is so soluble, but is similarly relatively insoluble in water. Notwithstanding these known solubilities, there is a surprisingly great degree of selectivity in the present method, which is effective in the absence of oxygen or oxidizing agents and when the solution contains practically nothing of any active character except an aqueous solution of sulfur dioxide. In a preferred form of the invention, the aqueous solution of sulfur dioxide is maintained saturated by maintaining above and in contact therewith an atmosphere consisting essentially of sulfur dioxide and in which oxygen is substantially or completely absent.

Figure 2:
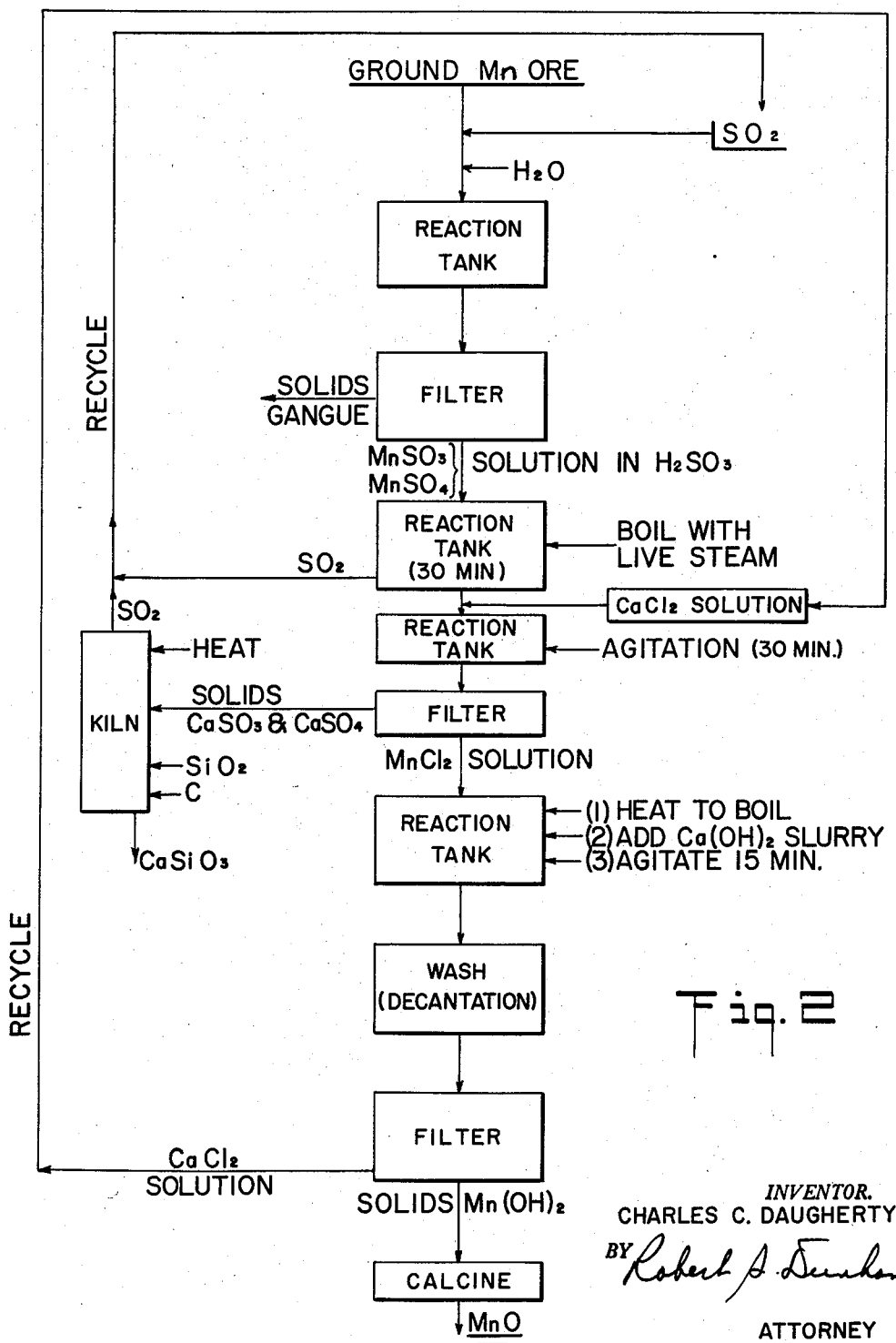

The present method is shown on a flow sheet basis in the accompanying drawings, in which:

Fig. 1 illustrates a preferred embodiment of the method of the present invention; and Fig. 2 illustrates a modification of the method of Fig. 1.

In accordance with the theories which are presently believed to be correct, when manganese occurs in several valence states in the ore and the ore is treated as generally above set forth with a saturated solution of sulfur dioxide, the manganese which is thereby dissolved or rendered soluble is in the form of manganese sulfite and manganese sulfate. It is believed that the divalent manganese values in the ore are converted to manganese sulfite; the tetravalent values to sulfate; and the trivalent values in part to sulfite and in part to sulfate. Any gangue originally in the ore, any manganese not dissolved by the leaching process generally set out above and most of the iron which is not solubilized by the leaching process remains solid and may be separated from the leach solution by any suitable separation process including filtering, centrifuging, decantation or otherwise. From the point of view of the present application, these separation processes for separating solids from liquids, whether the solid be an undissolved remainder or whether it be a precipitate formed as a result of a chemical reaction, are considered the equivalent of each other and may be broadly termed separation process or method steps.

In the usual practice of the present method the filtrate or separated solution following the leaching process is a solution of manganese sulfite and manganese sulfate in sulfurous acid. This solution is then subjected to a boiling operation to strip excess sulfur dioxide therefrom and then is preferably treated with calcium chloride, either before or after a further filtering or separation step as set forth in greater detail hereinafter. It will be understood that the boiling step for separating excess sulfur dioxide will result in throwing most of the manganese sulfite out of solution, as this compound is relatively little soluble in water. On the other hand, manganese sulfite is slightly soluble, so that some manganese sulfite will remain dissolved, as will substantially all the manganese sulfate. Any iron, which may have been solubilized by the leaching operation, will be carried through the process substantially parallel with the manganese, so that unless the solubilizing of the iron is repressed in the initial leaching step, there is nowhere else in the present process where this iron may be prevented from following through with the manganese. Further details of the process will be evident from particular descriptions of the preferred and alternate embodiments of the present invention and will be set out in examples which follow.

It may be pointed out at this time, however, that the present process distinguishes from the process of my prior patent in that no calcium chloride or other chloride is present during the leaching operation, and further that in the leaching operation the only active ingredient intended to be present other than water is sulfur dioxide, the leaching solution being a saturated aqueous solution of sulfur dioxide and the leaching being carried on in the absence of oxygen. This absence of oxygen is believed to be a critical factor in attaining the desired selectivity as between iron and manganese in accordance with this invention.

Referring now to the process as illustrated in flow sheet form of Fig. 1 of the accompanying drawings, the first step in the operation is to bring the ore, as by a suitable comminuting operation, to a desired degree of fineness, it being understood that this is important solely so that the leaching action may reach all parts of the ore being treated.

It is also contemplated as a possible alternative of the method or process at this stage that the ore may be subjected to a reducing step using any suitable reducing agent, so as to reduce the manganese and preferably also the iron values thereof to a lower valence state, i.e. a valence of two in each instance, as the process is more advantageously carried out with manganous and ferrous compounds in the ore rather than with the higher valence compounds of each metal. The ore is then leached in a suitable apparatus with a saturated aqueous solution consisting essentially of sulfur dioxide and water and which is substantially free of oxygen or air. For this purpose, the leaching step is preferably carried on in a closed container, from which all air is excluded and wherein an atmosphere consisting essentially of sulfur dioxide may be maintained above and in contact with the leach solution, so as to maintain this solution in a completely saturated condition. It seems to be immaterial whether the ore to be leached or the saturated sulfur dioxide solution is first introduced into the reaction zone or reaction vessel. In any event the leaching is preferably effected by agitating the comminuted ore in the leach solution as a slurry during the leaching step.

If desired, heat may be employed during the leaching operation, so as to assist in solubilizing the soluble materials or those which are made soluble incident to the reactions occurring during leaching.

Furthermore, if desired, superatmospheric pressures as set forth hereinafter in one of the examples may be employed during leaching. Such superatmospheric pressures usually result in the solubilizing of a somewhat higher percentage of the manganese present in the original ore. On the other hand, the process is entirely feasible when the leaching action is carried on at room temperature and at atmospheric pressure, so that neither temperature nor pressure are to be considered as critical factors affecting either the operability of the process as a whole or the selectivity thereof. The use of such higher temperatures and/or pressures is dictated by economic factors.

In order that the leaching step may be assured to be performed in the absence of oxygen and of oxidizing gases, it is contemplated as a useful and desirable step to purge the comminuted ore in the leaching zone or tank with nitrogen or some neutral gas, so as to remove all air or oxygen-containing gas therefrom and so as to eliminate the possibility of oxidizing influences during the leaching step, which is apparently essential to the selectivity of the process as aforesaid.

As a further optional alternative, a reducing agent of any suitable kind may be introduced into the leaching solution, so as to reduce higher valence compounds of manganese to the divalent or other lower valence state and so that the leached product will contain relatively more manganese sulfite. As aforesaid, and as an alternative to the last suggestion, the ore may be thermally or otherwise reduced prior to the leaching step to convert higher valence values of manganese to or toward the manganous state.

While the precise chemical reactions taking place during the leaching operation when conducted as aforesaid are not wholly understood, because of the possibility of a number of foreign materials being present in the ore which can influence these reactions, it has been found to be reasonably certain that the product of these reactions will be manganese in solution as sulfite and sulfate. In this connection, it is found that when the ore is reduced prior to the leaching operation or when reducing agents are present during the leaching operation, the amount of manganese sulfite is increased with respect to the amount of manganese sulfate. Also, when operating in accordance with the present invention, it is found that little or no polythionates are formed; or if some are formed, they do not apparently affect the desired reactions in an adverse manner. When operating in accordance with the present invention, in lieu of operations in accordance with the teachings of my prior patent aforesaid, it is found that in some instances a slight degree of selectivity is sacrificed. The savings effected by the recovery and reuse of the sulfur compounds, which is possible according to the present invention, is usually enough to outweigh this lower selectivity. This recovery of sulfur dioxide is not as possible when operating in accordance with the process of my prior patent. On the other hand, in accordance with the present invention, the process is sufficiently selective, so that the amount of iron present in the final product will not exceed about 4% to 5% and may be from that value down to a mere trace in some instances. This product, while not chemically pure, considering iron as a contamination, is still quite satisfactory for many purposes, which is particularly important in that the present process is substantially less expensive than is that of my prior patent aforesaid because of the low overall sulfur requirements of the present process.

The leaching operation may be carried on for any desired period of time, this time usually depending upon the conditions under which the leaching is conducted. Thus, for example, a period of three hours is usually adequate when the leaching is conducted substantially at room temperature and at atmospheric pressure. With higher temperature and/or with higher pressure, the leaching time may be somewhat shortened, with equivalent or better results. Time is not, however, a critical factor, as it will be understood that the proportion of the manganese of the original ore which is recovered is somewhat increased as the leaching time is increased; but that there is a period beyond which it is economically undesirable to carry the leaching time, as the additional manganese dissolved does not warrant tying up the necessary equipment for the additional time.

The leaching operation results in the production of a slurry, in which the undissolved material of the ore is the solid phase, while the aqueous solution of sulfur dioxide, including the dissolved manganese and some iron which has dissolved (notwithstanding the selectivity of the process) is the liquid phase.

The next operation is to separate the solid phase from the liquid phase, resulting in a leach liquor or filtrate containing the dissolved manganese. Most of the iron is left behind undissolved and may be separated with the gangue, which may be present in the original ore, along with some manganese which may not have been solubilized by the leaching operation. This solid material is discarded in accordance with the present process; although it may be used for any purpose for which it may be found suitable.

The leach liquor or filtrate is now treated to remove excess sulfur dioxide, preferably by boiling, e.g. with live steam. Because of the fact, which is independently known, that manganese sulfite is rather sparingly soluble in water, and ferrous sulfite is similarly relatively little soluble in water, these materials are thrown out of solution by this boiling operation and appear as a solid phase or precipitate in what is in fact a slurry, resulting from the boiling operation. The precipitate of manganese sulfite, which is whitish in appearance, may, in accordance with the preferred embodiment of the invention as set out in flow sheet form in Fig. 1, be then separated from the remaining solution at this point and may be refined to form a product of the process by calcining, which breaks down the manganese sulfite to an oxide of manganese which is believed to be $Mn_3O_4$. During this calcining operation, sulfur dioxide is given off, which may be recycled in the process. Also, in the boiling operation, the excess sulfur dioxide is driven off from the solution being boiled and from the slurry formed by the boiling operation, which sulfur dioxide may also be recycled in the process and used, for example, for the preparation of an additional quantity of sulfur dioxide solution for leaching further amounts of ore.

As disclosed in Fig. 1, when the precipitated manganese sulfite, which is thrown out of solution by the boiling operation, is separated from the remaining solution, there exists in this remaining solution all the manganese sulfate, which was formed as a result of the leaching operation, plus such of the manganese sulfite as did not precipitate (due to the low, but existent solubility thereof). This solution may then be treated with calcium chloride, preferably in the form of an aqueous solution thereof, to convert all the manganese present, whether in sulfate or sulfite form, to water-soluble manganese chloride, while precipitating calcium as calcium sulfate and some calcium sulfite. This reaction is sometimes termed an ion exchange reaction and results in the formation of slurry, including a solid phase consisting essentially of calcium in the form of sulfate and some sulfite, and a liquid phase consisting essentially of manganese in the form of chloride and in a solution in the water present.

Further, in accordance with the Fig. 1 form of the invention, a separation, e.g. a filtration, is now conducted to separate the precipitate or solid phase from the liquid phase, this solid phase including the precipitated calcium sulfate. If desired, the sulfur content of this calcium sulfate may be recovered by a known type of calcining operation in which silica and carbon are added, so as to strip sulfur dioxide therefrom and convert the calcium sulfate to calcium silicate. The sulfur dioxide recovered in this way may then be recycled in the process as aforesaid and as generally illustrated in Fig. 1.

The embodiment of the invention shown in diagrammatic or flow sheet form in Fig. 2 differs from that just described in that, following the boiling operation in which the excess sulfur dioxide is driven off and the manganese sulfite thrown out of solution as a precipitate so as to form a slurry, the separation step between the solid and liquid phases is not carried out at this point; but rather the calcium chloride solution, in an appropriate amount to react with all the manganese compounds present, is added at this point to the slurry. Here again, there will be a reaction, not only between the manganese sulfate and the calcium chloride to form manganese chloride in solution, and a precipitate of calcium sulfate; but also, and due to the small but nevertheless existing and important solubility of manganese sulfite, this manganese sulfite will react with the calcium chloride to form relatively insoluble calcium sulfite and to convert the manganese to a water-soluble form as manganese chloride. This reaction takes place (with appropriate agitation) to substantial completion, so that all the manganese, which was present as a result of the leaching operation, will be converted by reaction with the calcium chloride to manganese chloride; while calcium will be precipitated either in the form of calcium sulfate or calcium sulfite or both to the necessary extent. Here again, the reaction may be termed an ion exchange reaction.

Following the treatment with the calcium chloride there is produced as in the form of Fig. 1 in which the solution is treated with calcium chloride, a slurry in which calcium sulfate and calcium sulfite is the solid phase, while all the manganese is in solution as manganese chloride. The solid phase is then separated from the liquid phase by any suitable separation technique and means and the solid phase withdrawn for the recovery of sulfur dioxide therefrom by a known calcining process. This sulfur dioxide as aforesaid may then be recycled to the leaching step of the process.

Thus, in either form of the invention, there remains, following this separation step, a solution of manganese chloride, from which the manganese may be recovered and used in any suitable manner. The manner herein shown is substantially the same as that disclosed in my patent aforesaid and involves precipitation of the manganese as oxides and/or hydroxides by adding to the manganese chloride solutions a slurry of lime (as milk of lime $Ca(OH)_2$), the slurry containing considerable quantities of undissolved (as well as dissolved) calcium hydroxide. As a result, after maintenance of the mixed leach liquor and lime slurry in a reaction tank for a suitable length of time, with agitation if desired (although this is not always necessary), and preferably with the aid of heat, the manganese values are very largely precipitated in an oxide or hydrogenated oxide form. The precipitate may be described as manganese hydroxide, but is believed to be present as a hydrated oxide of manganese (chiefly in the manganous state) rather than a manganese hydroxide. It seems to be helpful at this stage if the solution, to which the lime slurry is added, is heated, this apparently facilitating subsequent filtration. A convenient practice is to heat the manganese chloride solution to boiling and then add the lime slurry.

After the lime slurry has had an opportunity to react to substantial completion with the manganese solution, there results a slurry which may be separated to yield a solid phase including the manganese in the form of oxides and/or hydroxides and possibly some excess lime and a liquid phase including calcium in the form of chloride. This calcium chloride solution may, if desired, be recycled to the previous step of the process in which the calcium chloride is used as aforesaid. While some small amount of the manganese may remain in solution at this point, it may be recovered and/or returned to the process if this solution is recycled as indicated on both forms of the invention in Figs. 1 and 2 of the drawings, so that there is no actual loss of manganese from the process at this point. It is found that the percent of manganese which fails to be precipitated will never rise above a certain relatively small equilibrium value. The precipitated manganese material, after filtration or other appropriate separation and washing with water, may then be calcined to yield manganese in oxide form and of commercially accepted purity, especially with respect to iron, phosphorous and other elements in the original ore. The calcined manganese oxide appears to be largely manganous oxide, perhaps with some manganese dioxide or some manganosic oxide ($Mn_3O_4$). The chief recovery is (except perhaps as the state of oxidation may be raised somewhat during the calcining process) of a manganese oxide in a state of oxidation average lower than the tetravalent form.

Although it may sometimes be desirable to carry out one or more of the operations aforesaid in a continuous or semi-continuous manner, the illustrated examples of the process of the present invention are advantageously batch processes.

The invention is further illustrated by examples which follow, in each of which a Maine ore having the concentration aforesaid (about 12% manganese, about 21% iron and slightly less than 1% phosphorous) was used as the starting material.

*Example I*

100 grams of the Maine ore aforesaid containing 12.11 grams of manganese was leached with 500 ml. of a freshly prepared aqueous solution of sulfur dioxide containing 31.72 grams of sulfur dioxide. The leaching process was continued for three hours at room temperature and atmospheric pressure. The resulting slurry was then filtered and the filtrate assayed, showing an apparent recovery at this point of 9.83 grams of manganese or 81.34%.

The filtrate was stripped of its excess sulfur dioxide content by heat and vacuum, whereupon the manganous sulfite present in the solution precipitated and was filtered off. This precipitate, containing 4.51 grams of manganese, was calcined in an electric muffle furnace at 1800° F. to produce $SO_2$ and $Mn_3O_4$.

The filtrate, containing 5.32 grams of manganese, was treated with an equivalent amount of calcium chloride solution to obtain manganese chloride and calcium sulfate. The calcium sulfate was filtered off, and the filtrate heated to boiling. 7.1 grams of pure calcium hydroxide was made into a slurry (milk of lime) with water and added with constant agitation. After filtering and washing it well with water, the precipitate was dried and then calcined at 1800° F. Upon analysis it was found to contain 5.20 grams of Mn in the form of an oxide assaying 59.5% Mn.

*Example II*

100 grams of the Maine ore aforesaid containing 12.11 grams of manganese was leached with 500 ml. of a freshly prepared sulfur dioxide solution containing 15.86 grams of sulfur dioxide. The leaching process continued for three hours at room temperature and atmospheric pressure. The resulting slurry was then filtered and the filtrate assayed, showing an apparent recovery at this point of 8.70 grams of manganese or 71.87%. The sulfur dioxide was then expelled from the filtrate by boiling.

A solution of 35 grams of calcium chloride in water was then prepared and added to the slurry and the mixture agitated for thirty minutes. The slurry was then filtered and the precipitate of the mixed calcium sulfite and sulfate was set aside for treatment to recover the sulfur dioxide therefrom. The filtrate was heated to boiling and a slurry of 11.3 grams of pure calcium hydroxide in 100 ml. of water was added, and the mixture agitated for 15 minutes. The precipitate was washed carefully by decantation and filtered. The filtrate, principally calcium chloride solution, was set aside for recycling.

The precipitate was dried at 120° C. and assayed with an apparent overall recovery of 8.55 grams of manganese or 70.63%. The concentrate was calcined at 100° C. for one hour, after which it assayed 57.17% manganese, 2.07% iron and 0.06% phosphorus.

*Example III*

100 grams of the same Maine ore containing 12.11 grams manganese was leached with 500 ml. of a freshly prepared sulfur dioxide solution containing 15.86 grams sulfur dioxide in a closed vessel, which was heated and operated at a pressure of 75 lbs. gauge during a leaching period of two hours. The pressure was released, and the slurry filtered and the filtrate assayed. The apparent recovery at this point was 10.64 grams of manganese or 88.65%.

After expulsion of the sulfur dioxide by boiling, an ion exchange reaction with calcium chloride, and subsequent precipitation with lime, as described in Example II, an overall recovery of 10.17 grams of manganese was made, a percentage of 83.97%.

The concentrate assayed, after calcining 58.73% manganese, 3.86% iron and 0.07% phosphorus.

It will be seen from the foregoing examples that in each instance a product was obtained consisting of over 50% manganese. In each instance, not all but a very large proportion of the manganese in the original ore was recovered; and in each instance in which the iron content of the resulting product is given (Examples II and III), the total iron is less than 4% of the final product, showing that the process was quite highly selective notwithstanding that the original ore contained a great deal more iron than manganese.

While two principal embodiments of the invention have been particularly disclosed and certain equivalents suggested as the description proceeded, further modifications and equivalents will occur to those skilled in the art from the foregoing disclosure. I do not wish to be limited, therefore, except by the scope of the appended claims, which are to be construed validly as broadly as the state of the prior art permits.

What is claimed is:

1. The method of recovering manganese values from ores containing both divalent and tetravalent manganese values, comprising the steps of leaching the ore with water saturated with sulfur dioxide and in the absence of oxygen, thereby dissolving the divalent manganese values as sulfites and the tetravalent values as sulfates, filtering the mixture to remove the gangue, boiling the filtrate to strip the sulfur dioxide therefrom and thereby to cause precipitation of manganese sulfite, filtering the precipitated manganese sulfite from the solution, calcining the manganese sulfite so filtered to produce sulfur dioxide and a manganese oxide, adding to said last mentioned solution a solution of calcium chloride and agitating the mixed solutions to produce an ion exchange reaction having calcium sulfate as a solid product and manganese chloride as a soluble product, separating the calcium sulfate from the resulting solution and mixing said resulting solution with a slurry of lime to precipitate the manganese values as manganese oxides and hydroxides, filtering the manganese oxides and hydroxides from the solution, and calcining the manganese oxides and hydroxides to a manganese oxide.

2. The method of recovery of manganese from ores in accordance with claim 1, including the further preliminary step of reducing the ore by heating it in a reducing atmosphere.

3. The method of recovering manganese values from ores containing iron and manganese and in which the manganese occurs in different valence states from 2 to 4 inclusive, comprising the steps of leaching the ore with an aqueous solution consisting essentially of water saturated with sulfur dioxide and in the absence of oxygen and oxidizing materials and thereby dissolving most of the manganese values of the ore in the sulfur dioxide solution as manganese sulfite and manganese sulfate, while leaving most of the iron in the gangue, separating the remaining solid material from the solution so as to remove gangue and undissolved material, boiling the solution remaining following this separation step to strip sulfur dioxide therefrom and thereby to cause precipitation of manganese sulfite, leaving the manganese sulfate and a minor amount of the manganese sulfite in solution, adding to the solution resulting from the last mentioned step a solution of calcium chloride and agitating the mixture to produce an ion exchange reaction having calcium sulfate and calcium sulfite as solid products and manganese chloride as a soluble product, separating the solid products present from the solution of manganese chloride, and recovering manganese values from the separated manganese chloride solution.

4. The method in accordance with claim 3, in which, following the boiling step causing precipitation of manganese sulfite, and prior to the addition of calcium chloride, the method comprises the step of separating the precipitated manganese sulfite from the remaining solution including the manganese sulfate and a minor amount of the manganese sulfite, and separately recovering manganese values from the separated precipitated manganese sulfite, the calcium chloride solution being added as aforesaid to said remaining solution.

5. The method in accordance with claim 3, in which the step of adding the solution of calcium chloride is effected prior to any filtering or separation step following the step aforesaid of boiling to strip sulfur dioxide therefrom, so that the solution of calcium chloride is added to a slurry including some precipitated manganese sulfite, the calcium chloride reacting with all the manganese compounds present, so as to convert substantially all the manganese present to the form of water-soluble manganese chloride and to precipitate calcium sulfite and calcium sulfate.

6. The method in accordance with claim 3, in which the original ore contains more iron than manganese; and in which as a result of the leaching operation of the process aforesaid, the final product, in the form of at least one of the oxides of manganese, contains not more than about 4 to 5% iron.

References Cited in the file of this patent

UNITED STATES PATENTS

| | | |
|---|---|---|
| 1,348,068 | Van Arsdale | July 27, 1920 |
| 1,835,474 | De Witt | Dec. 8, 1931 |
| 2,266,137 | Westby | Dec. 16, 1941 |
| 2,614,030 | Kamlet | Oct. 14, 1952 |

FOREIGN PATENTS

| | | |
|---|---|---|
| 290,491 | Great Britain | May 17, 1928 |

OTHER REFERENCES

Mellor: "Comprehensive Treatise on Inorganic and Theoretical Chemistry," Longmans, Green & Co., New York, 1930, vol. 10, pages 309, 310.

UNITED STATES PATENT OFFICE
CERTIFICATE OF CORRECTION

Patent No. 2,890,103 June 9, 1959

Charles C. Daugherty

It is hereby certified that error appears in the printed specification of the above numbered patent requiring correction and that the said Letters Patent should read as corrected below.

Column 7, line 27, for "hydrogenated" read -- hydrated --; column 9, line 53, for "material" read -- materials --.

Signed and sealed this 3rd day of November 1959.

(SEAL)
Attest:

KARL H. AXLINE
Attesting Officer

ROBERT C. WATSON
Commissioner of Patents